United States Patent [19]

Inaba et al.

[11] 4,374,349
[45] Feb. 15, 1983

[54] CONTROL SYSTEM FOR AN INDUSTRIAL ROBOT

[75] Inventors: Hajimu Inaba; Hideo Miyashita, both of Hino, Japan

[73] Assignee: Fujitsu Fanuc Limited, Hino, Japan

[21] Appl. No.: 294,797

[22] Filed: Aug. 20, 1981

[30] Foreign Application Priority Data

Sep. 1, 1980 [JP] Japan ............................. 55-119827

[51] Int. Cl.³ .......................................... G05B 13/00
[52] U.S. Cl. ................................... 318/568; 318/561
[58] Field of Search ................................. 318/561, 568

[56] References Cited

U.S. PATENT DOCUMENTS 4,240,016 12/1980 Inaba et al. .

Primary Examiner—B. Dobeck
Attorney, Agent, or Firm—Armstrong, Nikaido, Marmelstein & Kubovcik

[57] ABSTRACT

A control system for an industrial robot having a robot controlled in accordance with a position command signal and a position feedback signal and a control circuit for controlling the movement of said robot, said control circuit comprising an error register, a digital-analog converter, and a position gain multiplier between said error register and said digital-analog converter, wherein when the motor which drives said robot stops the rotation or when said motor gets ready to stop the rotation and an error value held in said error register becomes higher than a predetermined value, the multiplication factor of said position gain multiplier is increased, thereby a high accuracy of the positioning is accomplished.

2 Claims, 2 Drawing Figures

CONTROL SYSTEM FOR AN INDUSTRIAL ROBOT

BACKGROUND OF THE INVENTION

1. Field of the Invention

The present invention relates to a control system for an industrial robot.

2. Description of the Prior Art

A conventional motor control circuit which drives an industrial robot at r, θ and z directions (r is an absolute value, θ is an argument in polar coordinates and z direction is the perpendicular direction to the r, θ plane), and performs that the circuit receives a position command pulse, gains a difference of the pulse numbers between the position command pulse and a position feedback signal, the difference is set on an error register, the contents of the error register is converted to an analog value through digital-analog (DA) converter, and the motor is driven through a speed control device according to the analog value. In this system, since the value of the error register directly applies to the DA converter, the control by which the increase of the motor driving signal pulse is controlled cannot be accomplished correspondingly to the value indicated on the error register. Particularly there is a problem that the positioning error is increased when the motor stops the rotation.

Besides, a system in which a position gain multiplier inserted between the error register and the DA converter, is utilized, however, the system has only a fixed constant characteristic between the indicated value of the error register and the gain of the position gain multiplier, namely, the system controls the output of the DA converter along the straight lines corresponding to the error quantity being set on the error register, therefore, enough satisfaction regarding the error of the stopping position cannot always be obtained in the above-mentioned case.

The present invention is proposed in order to solve the above described problem in the conventional art.

SUMMARY OF THE INVENTION

The object of the present invention is to provide a control system for an industrial robot maintaining high stiffness to applied external force by providing a position gain multiplier between an error register and a DA converter, and by increasing the gain of the position gain multiplier when the motor stops the rotation, or when the motor gets ready to stop the rotation and an error value held on said error register becomes higher than a predetermined value, wherein the accuracy of the positioning for the industrial robot is improved.

According to the present invention there is provided a control system for an industrial robot having a robot controlled in accordance with a position command signal and a position feedback signal and a control circuit for controlling the movement of said robot, said control circuit comprising an error register, a digital-analog converter, and a position gain multiplier between said error register and said digital-analog converter, wherein when the motor which drives said robot stops the rotation or when said motor gets ready to stop the rotation and an error value held on said error register becomes higher than a predetermined value, the multiplication factor of said position gain multiplier is increased.

DESCRIPTION OF THE PREFERRED EMBODIMENTS

Figure 1:
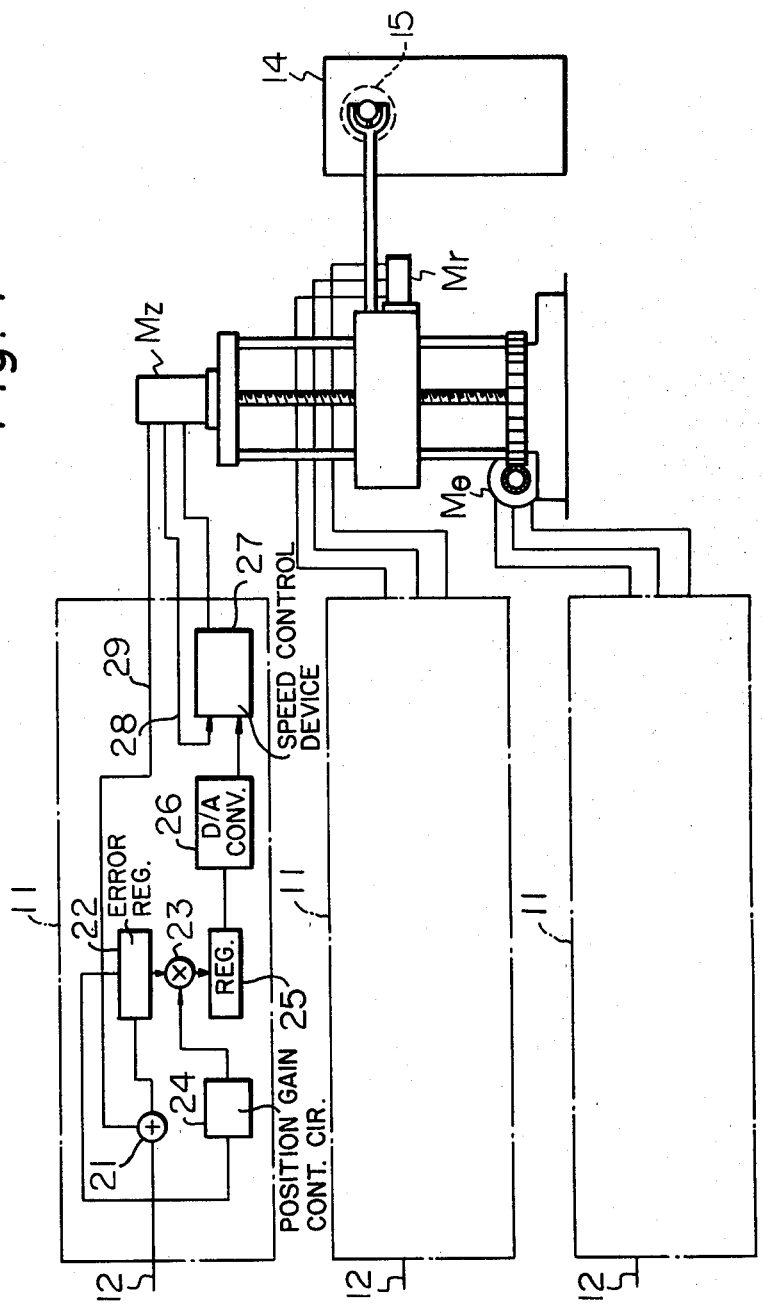
FIG. 1 is a block diagram illustrating the schematic constitution of an industrial robot apparatus using a control system for an industrial robot according to an embodiment of the present invention.

The schematic constitution of an industrial robot apparatus using a control system for an industrial robot according to an embodiment of the present invention is shown in FIG. 1. In this figure, the blocks indicated by the chain line are control circuits 11 for the robot, respectively, and the input of the control circuit 11 is supplied with a position command input 12. In the control system there are three control circuits 11 which control the movement of the robot towards the directions of r, θ and z, respectively, and the control circuits supply the motors Mr, Mθ and Mz which drive the robot with outputs thereof. The wrist portion 15 of the robot, the position of which is controlled by the three motors can attach take off and move works for a machine tool 14.

Figure 2:
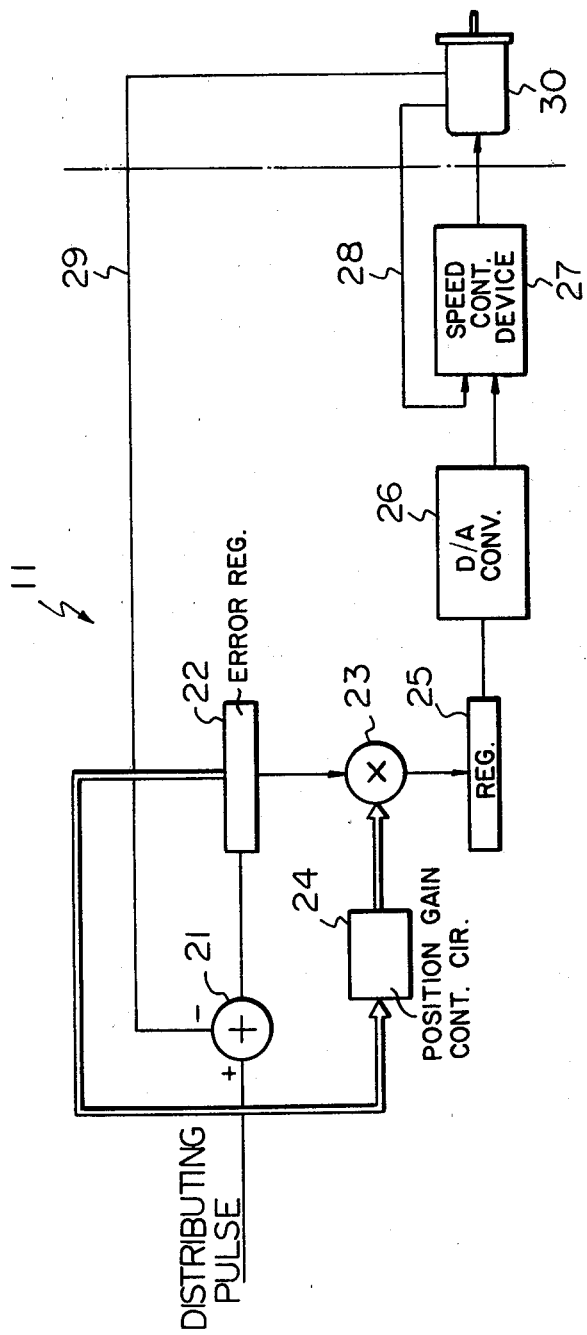
FIG. 2 is a block circuit diagram illustrating a control circuit in the apparatus in FIG. 1.

The detail of the control circuits 11 is shown in FIG. 2 as a block circuit diagram. A distributing pulse which is applied from an external line as a position command input is supplied to an adder 21 and the other input of the adder 21 is connected to a position feedback signal 29 which is fedback from the motor 30. The output of the adder 21 is supplied to the error register 22 and the value held on the error register is supplied to the position gain multiplier 23. The output of the position gain multiplier 23 is supplied to a register 25, the value held on the register 25 is applied to one input of a speed control device 27 after conversion at a DA converter 26, and the output of the speed control device 27 is connected to the motor 30. A speed feedback signal 28 from the motor 30 is applied to the other input of the speed control device 27. The output of the error register 22 is divided and the divided output is connected to a position gain control circuit 24, and the output of the position gain control circuit 24 is supplied to the position gain multiplier 23 as a position gain command.

The operations of the above mentioned circuits are described below. The position feedback signal 29 from the motor 30 is substracted from the distributing pulse supplied from the external line as a position command input at the adder 21, and the value of the difference is indicated on the error register 22. The value of the error register 22 is finally supplied to the register 25, however, therebetween the position gain multiplier 23 is inserted and the position gain multiplier 23 is predetermined in order to increase the multiplication factor of the position gain multiplier 23 by the position gain control 24 when the motor 30 is maintained at a stopped condition or when the motor 30 stops the rotation or when the motor 30 gets ready to stop the rotation and the position error is higher than a predetermined value. The digital value on the register 25 is converted to an analog signal through the DA converter 26 and the converted signal is applied to the speed control device 27 as a speed command signal, and both the converted signal and the speed feedback signal 28 being fedback from the motor 30 constitute two inputs to the speed control device 27. The output of the speed control device 27 controls the motor 30. For example, a multiplier like a shiftregister is utilized as the position gain multiplier 23.

By using the above mentioned control circuits 11, a high accuracy in the position gain and a decrease in the position error of the motor 30 can be obtained when the motor approaches the stopping position, or when the motor reaches the almost stopped condition or when the error held in the error register is high or when the motor stops the rotation.

By using the present invention, an industrial robot maintains a high stiffness character and increases the positioning accuracy.

We claim:

1. A control system for an industrial robot having a set of motors for driving the industrial robot and a set of control circuits for controlling said motors, each of said control circuits comprising:

an adder for receiving a position command input signal and a position feedback signal from a corresponding motor;

an error register for receiving the output signal of said adder means;

a position gain control circuit for receiving the output of said error register;

a position gain multiplier for receiving an output signal of said error register and the output signal of said position gain control circuit;

a register for receiving the output signal of said position gain multiplier;

a digital-analog converter for receiving the output signal of said register; and a speed control device for receiving the output signal of said digital-analog converter and supplying signals to the corresponding motor;

wherein the multiplication factor of said position gain multiplier is increased when said motor is stopped or gets ready to be stopped and an error value held in said error register becomes higher than a predetermined value.

2. A control system for an industrial robot as set forth in claim 1 wherein said position gain multiplier includes a shift register, the value of which is shifted up in response to said increases in the multiplication factor.

* * * * *